March 23, 1926.
F. R. ANDERSON
1,577,673
COIN CONTROLLED WEIGHING MACHINE OR SCALE
Filed Feb. 28, 1922   6 Sheets-Sheet 1
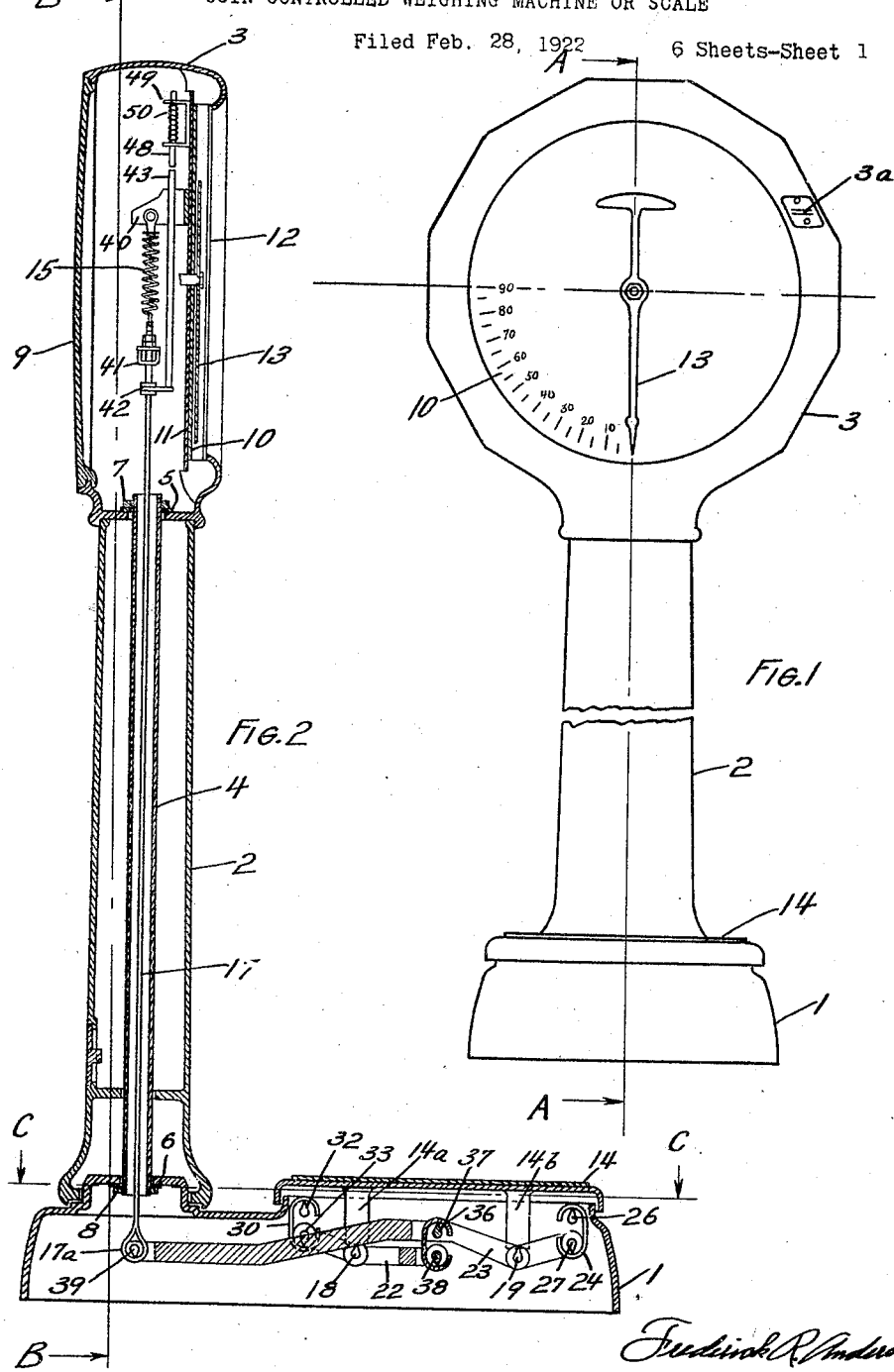

March 23, 1926.
F. R. ANDERSON
COIN CONTROLLED WEIGHING MACHINE OR SCALE
Filed Feb. 28, 1922    6 Sheets-Sheet 2
1,577,673
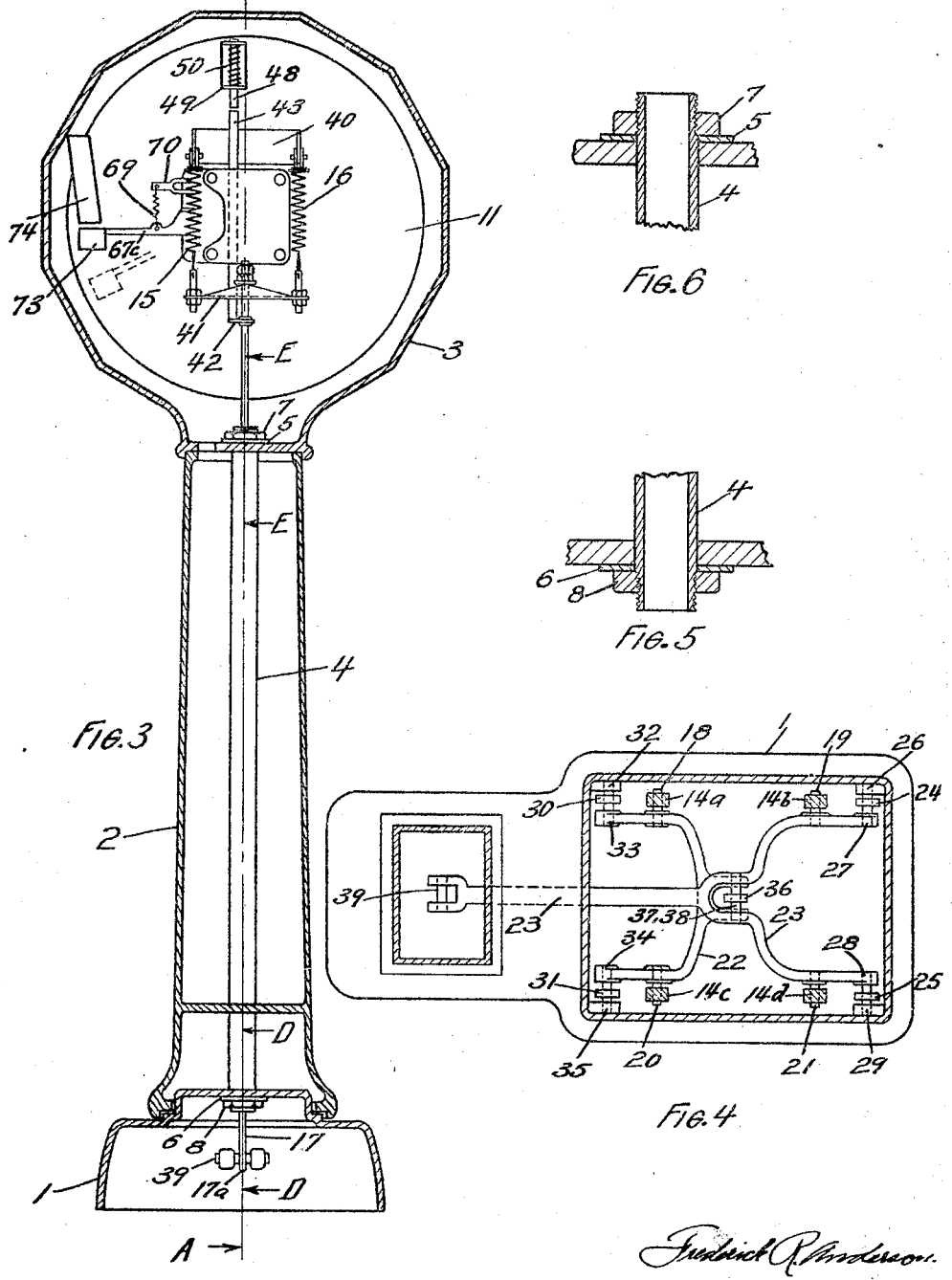

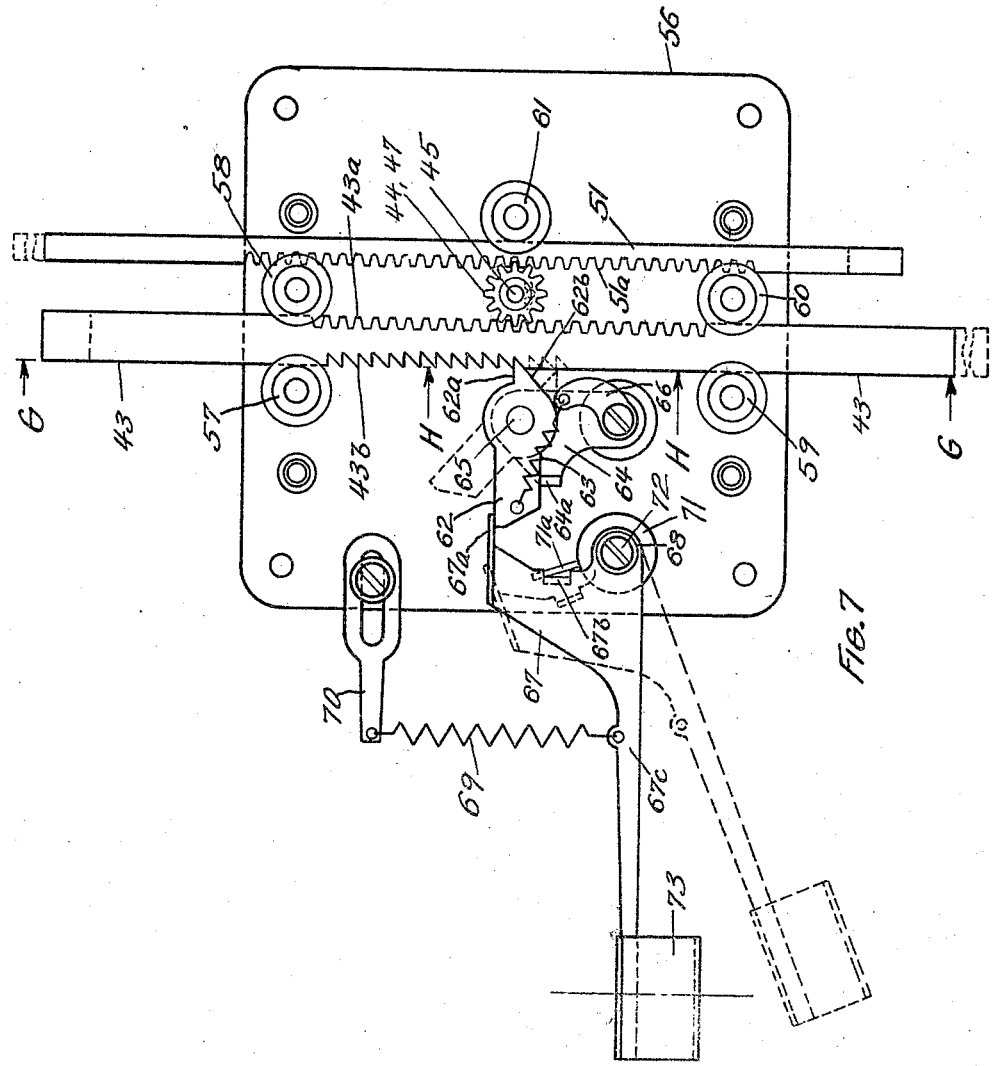

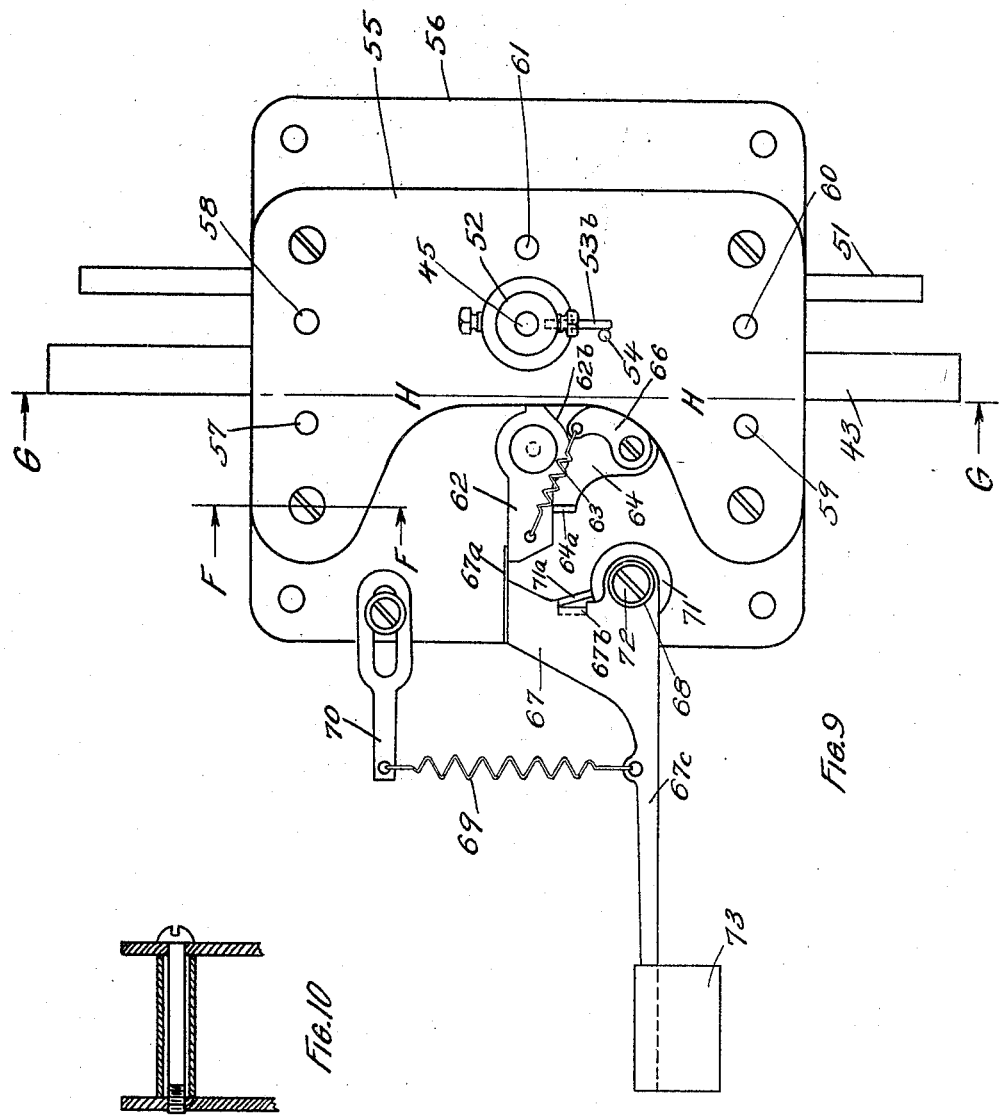

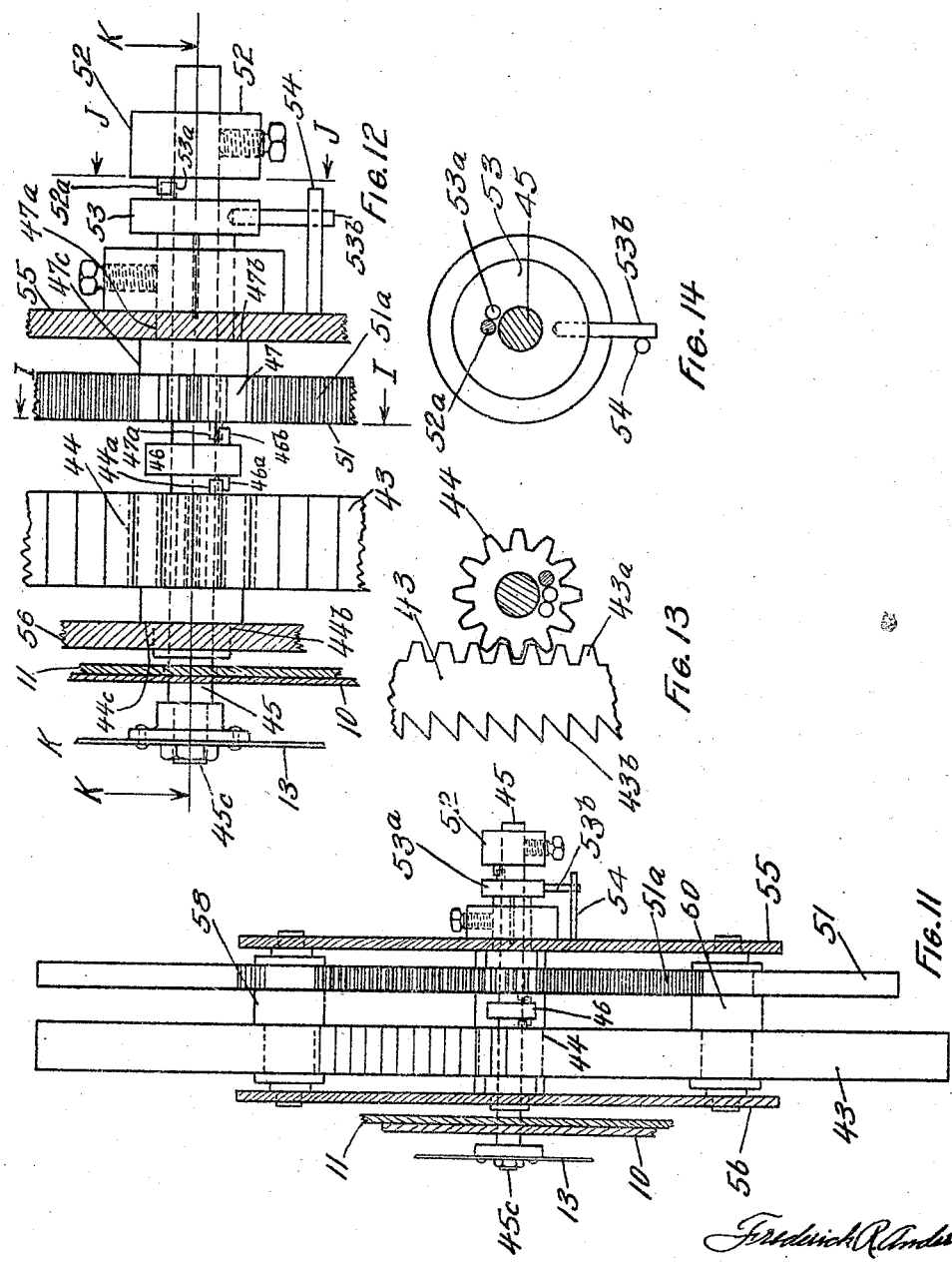

March 23, 1926.

F. R. ANDERSON 1,577,673

COIN CONTROLLED WEIGHING MACHINE OR SCALE

Filed Feb. 28, 1922    6 Sheets-Sheet 6

Frederick R. Anderson.
INVENTOR.
By  C.R. Carpenter
ATTORNEY.

Patented Mar. 23, 1926.

1,577,673

UNITED STATES PATENT OFFICE.

FREDERICK R. ANDERSON, OF MINNEAPOLIS, MINNESOTA, ASSIGNOR TO NATIONAL NOVELTY COMPANY, OF MINNEAPOLIS, MINNESOTA, A CORPORATION OF MINNESOTA.

COIN-CONTROLLED WEIGHING MACHINE OR SCALE.

Application filed February 28, 1922. Serial No. 539,950.

*To all whom it may concern:*

Be it known that I, FREDERICK R. ANDERSON, a citizen of the United States of America, and resident of Minneapolis, Hennepin County, State of Minnesota, have invented certain new and useful Improvements in and Relating to Coin-Controlled Weighing Machines or Scales, of which the following is a specification.

This invention relates to certain improvements in coin controlled weighing machines or scales; and the objects and nature of the invention will be readily understood by those skilled in the art in the light of the following explanation of the accompanying drawings showing what I now believe to be the preferred mechanical expression or embodiment of my invention from among other forms, constructions, arrangements or combinations within the spirit and scope thereof.

An object of this invention is to provide improvements in coin controlled weighing machines or scales whereby the accuracy, reliability and efficiency of the same may be increased without unduly complicating the mechanism or increasing the cost of manufacture.

A further object of this invention is to provide improvements in coin controlled weighing machines or scales whereby certain fraudulent usages of the same may be prevented.

A further object of this invention is to provide improvements in coin controlled weighing machines or scales whereby injuries to the delicate actuating and indicating mechanism resulting from certain malicious abuses to which such machines are subject, may be prevented.

With these and other objects in view my invention consists in certain novel features in construction and in combinations and arrangements as more fully and particularly set forth and specified hereinafter.

Referring to the accompanying drawings:

Figure 1 is a reduced front view of a coin controlled weighing machine with a part of the column removed.

Figure 2 is a reduced sectional view on line AA Figure 1.

Figure 3 is a reduced sectional view on line BB Figure 2.

Figure 4 is a reduced sectional view on line CC Figure 2, with platform removed and showing the scale levers in position.

Figure 5 is a sectional view somewhat enlarged over that of Figure 3 taken on the center line AA of the hollow tie bolt between D and D Figure 3.

Figure 6 is a sectional view somewhat enlarged over that of Figure 3 taken on the center line AA of the hollow tie bolt between E and E Figure 3.

Figure 7 is an actual size rear view of the indicating and actuating mechanism with the rear frame plate and the indicator zero actuating arrangement removed.

Figure 8 is an actual size end view of the coin receiving cup.

Figure 9 is an actual size rear view of the indicating and actuating mechanism with the back plate in position and showing the indicator zero actuating arrangement.

Figure 10 is an actual size section view on line FF Fig. 9.

Figure 11 is an actual size sectional view taken on line GG Figure 7.

Figure 12 is an enlarged sectional view taken on line GG Figures 7 and 9 between H and H.

Figure 13 is a sectional view on line I I Figure 12.

Figure 14 is a sectional view on line JJ Figure 12.

Figure 15:
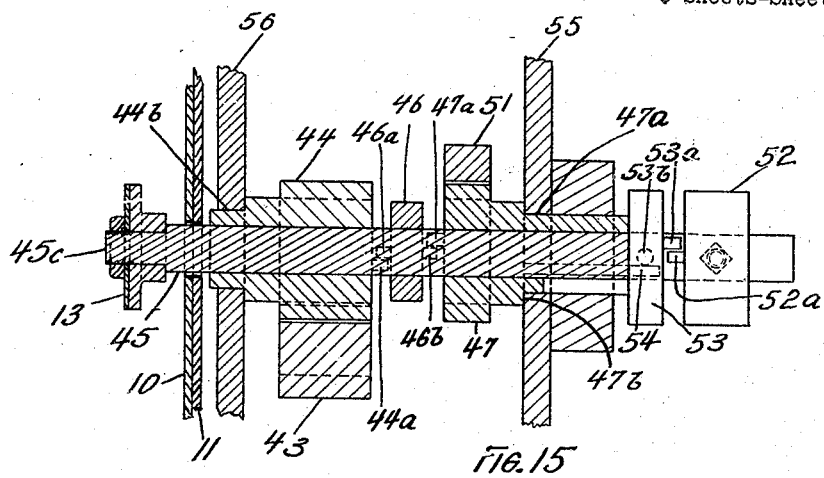
Figure 15 is a sectional view taken on line KK Figure 12.

In the drawings, I disclose an embodiment of my invention in the form of a coin controlled weighing machine or scale although I do not wish to so limit or restrict all features of my invention.

The machine illustrated embodies a horizontally disposed hollow base 1, a hollow vertical column 2 which rises from the rear end portion of the base, and at its upper end is provided with an upright hollow annular head 3 usually cast open at the front and rear. The base 1, column 2 and head 3 being rigidly secured to each other by means of the hollow tie bolt 4, washers 5 and 6 and nuts 7 and 8. Suitable walls or closures are applied to the head 3 to close the same at the front and rear. For instance, I show a cover or wall 9 closing the rear of the head, while the face or dial plate 10 and the front plate or disk 11 are secured in the head to close the same at the front. Also a transparent plate 12 is usually secured in the head to cover and protect the dial plate 10 and the indicating finger 13.

The weighing platform 14 to receive the object or load to be weighed, is arranged above the base and is yieldingly upheld and vertically movable. The weighing platform is yieldingly upheld by suitable scale springs 15 and 16 through the medium of tension rod 17 and any suitable scale leverage.

In the particular example illustrated, the platform is supported by four depending legs 14ᵃ, 14ᵇ, 14ᶜ and 14ᵈ their lower ends resting on the horizontal edges or transverse pivot bars 18, 19, 20, and 21 fixed to and carried by supplemental vertically-swingable scale lever 22 and main vertically-swingable scale lever 23 respectively. The main lever 23 is fulcrumed at its front end to the base through the medium of vertical links 24 and 25 and transverse knife edge pivots or bearings 26, 27, 28 and 29.

The supplemental lever 22 is fulcrumed at its rear end to the base through the medium of vertical links 30 and 31 and transverse knife edge pivots or bearings 32, 33, 34 and 35. The front end of the supplemental lever 22 is sustained by and hung from the main lever 23 at a point intermediate the length of the main lever through vertical link 36 and transverse knife edge bearings or pivots 37 and 38. The free end of the main lever 23 is extended rearwardly to a point below the column 2 for connection with the vertical tension rod 17 which extends through the column and into the head 3.

The tension rod upholds the rear end of the main lever 23 to carry the platform load, through the medium of transverse knife edge pivot or bearing 39 rigid with said lever and loop or eye 17ᵃ formed by the lower end of the tension rod and engaged by said pivot.

In the particular example illustrated, the weighing counter-balance for the platform 14 is provided by a scale spring composed of a pair of parallel coiled expansion springs 15 and 16 arranged in the head 3 and at their upper ends hung from supporting bracket 40 fixed to disk 11 and at their lower ends secured to spring yoke or cross head 41 confined on the upper end of tension rod 17.

The scale spring yieldingly upholds the platform 14 and the scale leverage described is so proportioned and arranged that the distance the tension rod 17 is moved downward by the load bears a known proportional or scaled relation to the weight of the load. The proportional or scaled movement of the tension rod 17 is translated into intelligible visible weight readings or indications through the medium of a visible progressive scale of numbers on face plate or dial 10 with which visible rotatable indicator or pointer 13 co-operates, and motion transmission mechanism for said indicator controlled in its movements, indirectly at least, by the tension rod.

The upper end portion of the tension rod is provided with a laterally-projecting gage or stop finger 42 fixed to the rod to move vertically therewith and it is this gage that determines the weight indicating position to be assumed by the indicator 13 on each operative swing or movement of that indicator. The gage is preferably vertically adjustable on the tension rod to attain accuracy and for correction. If so desired, this capability or vertical adjustment can be attained through a screw-threaded connection and nuts.

The operating or transmission mechanism for the indicator 13 consists of a reciprocating member geared to the indicator 13 to rotate the same on its operative strokes, and the length of the operative stroke of this member is determined by the position of the gage 42. In the example illustrated, said member is formed by a vertical bar 43 parallel with tension rod 17 and disconnected therefrom to reciprocate vertically independently thereof. This bar 43 is formed with transverse gear teeth forming the rack 43ᵃ in constant mesh with the gear or toothed indicator actuating pinion 44 which is rotatably mounted on the axle 45 of the indicator 13 and controls the angular position of said indicator with respect to the scale on the face plate 10, through the longitudinal projection 44ᵃ of the pinion 44, the two longitudinal projections 46ᵃ and 46ᵇ of the coupling disc 46 which is rotatably mounted on the axle 45 and the projection 47ᵃ of the toothed pinion 47 which is rigidly secured to the indicator axle 45. The gage 42 is located below the lower end of the rack bar 43 and said end of the rack bar normally abuts the top face of said gage.

A yielding or spring bumper is provided to cushion the rack bar at its limit of upward movement and to yieldingly hold said rack bar down to its normal inoperative position Figs. 2 and 3 and if need be to give it a quick start on its operative stroke when released. For instance, I show bar 48 alined with the rack bar and arranged above the same to engage the upper end thereof, said bar being slidable upwardly in bracket 49 secured to disk 11 and is yieldingly held downwardly by coiled spring 50.

By Figures 2 and 3 it will be noted that when the parts are in normal position, the indicator 13 is at zero (Fig. 1) and the rack bar is at its approximate limit of upward movement and in effect held between the gage 42 and the spring-pressed bumper 48. The gage 42 is also at its normal limit of upward movement with the scale platform at its limit of upward movement. When the load to be weighed is located on the platform, the tension rod 17 immediately descends carrying the gage 42 downwardly a distance that should accurately represent the weight of the load.

As hereinafter appears, the rack bar is normally locked to normally hold the indicator 13 at zero position. However, if the rack bar is released while the load is on the platform and the gage correspondingly lowered, the rack bar will thereupon descend by reason of its own weight plus any other propelling force that may be applied thereto, until the lower end of the bar engages the gage. The downward movement of the bar rotates the indicator 13 to the proper position on the scale of the face plate or dial to indicate the weight of the load on the platform.

When the load is released from the platform, the gage, under the power of the scale springs 15 and 16 raises the rack bar to normal position and allows the indicator to be returned to zero.

To attain maximum accuracy in positioning the indicator pointer 13 along the graduations or scale designations on the dial with respect to the movements of the rack bar, I preferably provide means to take up lost motion or so-called "back lash" between the meshing gear teeth of the rack bar and indicator pinion. For instance, I show an elongated weight or bar 51 provided with longitudinal gear teeth along one side forming a rack 51ª which is in constant mesh with the side of the indicator axle pinion 47 opposite the side to which the indicator actuating rack 43 meshes with indicator actuating pinion 44. Thus arranged it exerts a constant tension in one direction on the indicator actuating pinion to hold the pinion teeth tightly against the indicator actuating rack bar teeth and thereby automatically takes up lost motion between the pinion and rack bar, permitting a more accurate registration of weights by the indicator pointer.

Due to the sudden shock that would be transmitted to the indicator from the impact of the indicator rack bar 43 with the gage 42, providing the indicator actuating gear 44 was rigid with the indicator axle 45, the actuating gear 44 is allowed to revolve on said indicator axle and is provided with a projection 44ª which as it revolves clockwise comes in contact with projection 46ª of the coupling disc 46 which is also rotatably mounted on the pinion shaft and is provided with a second projection 46ᵇ on the side opposite to projection 46ª which as the coupling revolves comes in contact with the projection 47ª of the indicator axle pinion 47 which is rigid with the axle to which the indicator is secured. Therefore after the indicator rack bar has reached the limit of its downward stroke, predetermined by the gage 42, the indicator will not instantly come to rest with a sudden shock, but will, due to the force transmitted to it from the falling indicator rack, continue on its course beyond the correct reading until its stored energy has been dissipated, when it will be gently brought to rest by the balance rack 51 opposite the correct reading as predetermined by the gage 42.

Furthermore, if the weight or object being weighed should be suddenly or violently removed from the platform, the scale springs 15 and 16 would instantly contract causing the gage 24 to force the upper end of the indicator rack bar violently upward against the bumper bar 48. Now if the indicator actuating gear was rigid with the indicator axle the indicator would not only receive a severe shock by being suddenly started from a state of absolute rest by the removal of the load, but would also receive a severe shock in the opposite direction by being instantly brought to rest by the impact of the upper end of the indicator rack with the bumper bar 48, but as previously stated and shown in the drawings and specifications, the indicator pinion is rotatably mounted on the indicator axle, and that as the indicator rack is forced violently upward, the indicator actuating pinion is revolved anti-clockwise and its lateral projection 44ª, drawn away from the lateral projection 46ª of the coupling disc 46, thus allowing the indicator to be gently brought to rest over the zero graduation by the force of gravity acting on the balance rack 51 and transmitted to the indicator through the indicator axle pinion 47 and the indicator axle 45.

The extreme back end of the indicator axle is provided with means whereby adjustments may be made to cause the indicator to accurately register with the zero graduations when the scale mechanism is in the no weight position. To accomplish this end the set collar 52 is adjustably secured to the extreme rear end of the indicator shaft and is provided on its front or inner side with the projection 52ª which operates in conjunction with the lateral projection 53ª on the rear side of the coupling disc 53 to bring the radial projection 53ᵇ of the disc 53 to abut with the stop pin 54 projecting from the back side of the rear frame 55 of the actuating mechanism, which, (if the set collar 52 has been correctly adjusted longitudinally of the indicator axle) will bring the indicator to rest over the zero graduation, through the force imparted to it from the balance rack 51.

To prevent the projection 53$^b$ of the coupling disc 53 from coming in abrupt contact with the stop pin 54 and causing undue shock to the indicator, the coupling disc 53 is rotatably mounted on the indicator axle and at its rear side is provided with the projection 53$^a$ which is operated on counter clockwise movements by the projection 52$^a$ of the set collar 52 coming in contact with it, but on clockwise movements of the indicator the projection 52$^a$ of the set collar 52 draws away from the projection 53$^a$ of the coupling disc 53 which allows the indicator to make approximately two complete revolutions before the projection 53$^b$ will come in contact with the stop pin 54 which has been proven by careful experiments, to be a sufficient distance in which to allow the indicator to dissipate all stored energy and to return to the correct reading predetermined by the gage 42 as previously stated.

The indicator rack bar 43 and counter weight rack 51 are confined between the frame plates 55, 56 and are guided and held to the indicator and indicator axle pinions and to movements in a straight line by suitable means carried by said frame plates. For instance, for this purpose, I show an upper pair of opposite parallel flanged idler rolls 57, 58 and a corresponding lower pair of parallel flanged idler rolls 59, 60 and an intermediate flanged idler roll 61. These rolls extend between said frame plates 55, 56 and at their opposite ends are formed with trunnions or journals mounted in said plates to freely revolve (see Figs. 7 and 11). The cylindrical surfaces of the rollers engage the side faces of the rack bars and hold said bars properly positioned radially with respect to the indicator pinion, while the flanges of said rollers engage the front and rear edges of the rack bars and hold the same in proper position longitudinally of the pinion.

These co-operating guiding rolls for the rack bars are designed to permit free and easy vertical reciprocation of the bar with a minimum of retarding friction.

The indicating pointer 13 is carried by a horizontal rotary shaft or axle 45 and is secured to the front end 45$^c$ thereof. The arbor extends rearwardly from the pointer, through dial 10, disk 11 and frame plates 55, 56. The outer hubs of the pinions in which the axle 45 is mounted are formed with reduced end trunnions or journals 44$^b$, 47$^a$ rotating in bearing openings in said plates and forming annular end shoulders 44$^c$, 47$^b$ to abut the inner side faces of the frame plates.

A coin controlled mechanism is provided to normally lock the indicating mechanism (rack bar and indicator) against indicating operation until the proper coin is introduced into the machine at the proper time, i. e., while the load (the weight of which is to be indicated) is located on and carried by the scale platform.

The indicating mechanism is in the example shown, locked in normal or zero position, with the rack bar approximately at its limit of upward position, through the medium of a ratchet or downwardly beveled tooth or notch in the edge of a rack bar opposite the gear teeth or rack 43$^a$ and suitable means co-operating with said tooth or notch. In the particular embodiment illustrated, this tooth is the lower one of a longitudinal series of closely arranged downwardly-facing beveled teeth or notches 43$^b$.

Figure 16:
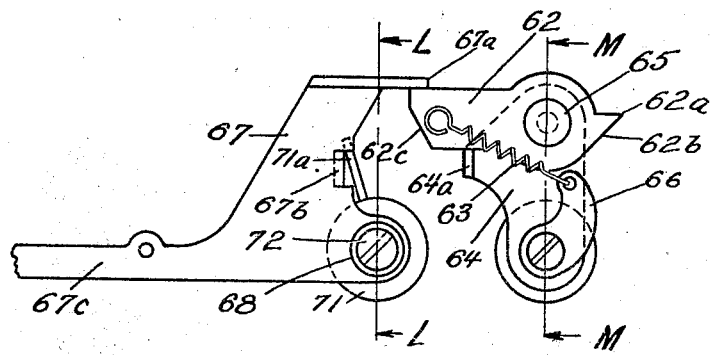
Figure 16 is an enlarged elevation of the rack pawl, coin arm, latch, etc., other cooperating parts being broken away.
Figure 17:
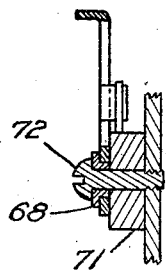
Figure 17 is a sectional view on line LL Figure 16.
Figure 18:
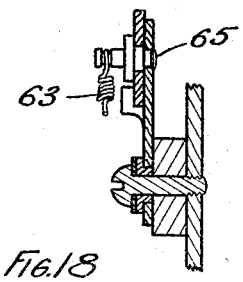
Figure 18 is a sectional view on line MM Figure 16.

A vertically-swingable toothed dog or pawl 62 co-operates with said lower tooth to hold the rack bar with the indicator pointer at zero. The pawl is longitudinally elongated and at its end adjacent to the rack bar is formed with the longitudinally projecting point or tooth 62$^a$ providing a top shoulder and a beveled lower edge 62$^b$ past which the beveled notches of the rack bar can slip when the rack bar is forced upwardly and the pawl is thereby forced rearwardly to snap from notch to notch under the power of the retractive spring 63 that yieldingly holds the pawl in its normal position. The pawl 62 is mounted to reciprocate longitudinally as well as to swing or rock vertically, and these two movements are provided for by mounting the pawl on the upper end of the rocker arm 64 by means of the loosely fitting shoulder pivot 65, Figures 16 and 18. The pawl spring 63 is secured to the free end or heel of the pawl and to a spring bracket 66 and constantly tends to press the pawl longitudinally toward the rack bar and to yieldingly hold the pawl in its normal horizontal rack bar locking position with the lower straight edge of the pawl bearing against a suitable stop, in this instance formed by the projecting lug 64$^a$ of the rocker arm 64, Figures 7, 9 and 16. The pawl spring 63 is relatively light or weak in power and is not of sufficient strength to hold the pawl from swinging to release the indicating mechanism. In other words, the weight of or the load on the indicator rack bar 43 tending to force said bar downward is sufficient to overcome the spring 63 and swing the pawl and permit descent of said bar. It is hence necessary to provide a lock or latch to normally hold said pawl against rack bar releasing swing. To this end, I provide a vertically swingable latch plate 67 arranged between the frame plates and swingable on axis 68 parallel with the pawl pivot 65, and having a nose 67ᵃ rigid with the latch plate and arranged to normally extend over the top edge of the pawl heel and prevent upward movement thereof and thereby lock the pawl against swing. The nose 67ᵃ when in pawl locking position is so located above the latch plate pivot bushing 68 that upward pressure of the pawl on the nose will not tend to swing the plate to release the pawl, although spring 69 secured to spring bracket 70 constantly tends to hold the latch plate in pawl locking position with its stop 67ᵇ against the projection 71ᵃ of the spacing washer 71 which is rigidly secured to the front frame plate 55 by means of the binding screw 72.

The latch plate is rocked against the power of spring 69 to release the pawl, by the weight of a proper coin introduced into the machine. For instance, I show elongated arm 67ᶜ rigid with the latch plate 67 and normally extending horizontally therefrom behind and approximately parallel with the disk 11 and at its free end carrying coin cup or trough 73. This coin cup is normally located in coin-receiving position at the lower discharge end of vertical coin chute or tube 74 secured to and arranged at the rear face of disk 11. The coin slot or opening 3ᵃ from the machine front opens or discharges into said tube or chute 74. The spring 69 attached to latch plate 67 through the medium of arm 67ᶜ yieldingly holds the latch plate in pawl locking position and the coin cup in coin receiving position at the lower end of the coin chute.

With the parts in positions indicated by Figures 1, 2, 3 and 7 if the load or object to be weighed is placed on the scale platform 14, the gage 42 will be moved down from the lower end of rock bar 43 a distance proportional to the weight of the load and will be held at such lowered position so long as the load remains on the platform. The indicating pointer remains at zero and is not concerned in the movement of the weighing mechanism and gage 42, so long as the rack bar 43 remains locked by the pawl and its latch. However, if while the load remains on the platform, a proper coin is inserted through slot 3ᵃ and dropped into cup 73 the weight of the coin will cause the latch to swing vertically as the arm descends against the tension of coin weighing spring 69 until the coin drops from the cup, whereupon said spring will return the latch and its arm to normal positions. The swing of the latch under the weight of the coin, moves the pawl locking nose 67ᵃ upwardly and back from the heel of the pawl to free the same and permit upward swing thereof under the load of the rack bar on the point of the pawl. The rack bar will then descend until its lower end abuts the gage 42 and the indicator point will swing to the designation on the dial that indicates the weight of the load.

The latch returns to normal position quickly after the pawl has swung to release the rack bar while the latch is in its tilted rack bar releasing position, and nose 67ᵃ of the latch swings in under the elevated heel of the then tilted pawl. As the rack bar descends with the pawl thus tilted, the point of the pawl is inclined downwardly and snaps from tooth to tooth and bears against said ratchet teeth as they slip down past said pawl point. When the scale platform is relieved of the load and the gage 42 thereupon pushes the rack bar quickly on its return stroke, the pawl will be restored to normal position with the aid of its spring 63 by the engagement of the pawl point with the series of ratchet teeth. The upward movement of the toothed edge of the bar will force the point of the pawl up and thereby rock the pawl and move the same longitudinally. The heel of the pawl will swing down on the nose 67ᵃ of the latch and the beveled end edge 62ᶜ of the pawl heel will then swing the latch by engagement with the latch nose so that the pawl will slip down past the latch and to normal position bearing on the projection 64ᵃ of the rocker arm 64. The latch will immediately return to locking position with its nose overhanging the pawl heel. This return of the pawl to normal position is accomplished by the upward passage of one of the ratchet teeth 43ᵇ past the pawl point, and thereafter the pawl reciprocates longitudinally as the ratchet teeth 43ᵇ slip past the pawl point and the pawl is forced back by the resulting cam action of such teeth on its beveled lower edge. While in this position with the latch in locking position, the rack bar is locked against downward movement although free to move upwardly under the power of the scale spring applied through gage 42.

The series of ratchet teeth in connection with the co-operating pawl and its latch, prevent operation of the machine to secure more than one weight indication by only one coin insertion as by the more or less common method of applying another load to the scale platform while the previous load is partially sustained by the platform. With my construction a partial removal of the load from the platform will cause upward movement of the gage 42 and consequent restoration of the pawl to normal position, thereby locking the rack bar against downward movement. If the load on the platform is reduced sufficiently to cause upward movement of the rack bar a distance approximately equal to the distance from one ratchet tooth to the next, such upward rack bar movement will be sufficient to restore the pawl to normal locking position.

If another load is applied to the scale platform without reducing the weight of a previous load applied to and still remaining on the platform, the gage will move down to a position corresponding to the aggregate weight of the two loads and the rack bar will continue down with the gage, and the indicator pointer will move to the figure on the dial indicating such aggregate or gross weight. If the first load is then entirely removed from the platform, the scale spring will return the parts to an intermediate position, but the friction of the pawl against the rack bar and the load on the rack bar will prevent an accurate weight indication by the indicator pointer when it stops on its backward movement at an intermediate position. In other words, the mechanisms are constructed and arranged to avoid accurate weight indications on their return movements.

It is evident that various changes, modifications and variations might be resorted to that parts might be omitted, or features added, without departing from the spirit and scope of my invention, and hence I do not wish to limit myself to the exact disclosures hereof.

What I claim is:

1. In a coin controlled weighing machine, an indicating mechanism embodying a reciprocatory member having a series of ratchet teeth beveled to permit return movement of said member, controlled stop means therefor, coin controlled locking means for said mechanism including a locking pawl co-operating with said teeth, and a coin released locking latch for said pawl, said latch and pawl being spring held and said pawl being swingable and longitudinally movable.

2. In a coin controlled weighing machine, an indicating mechanism embodying a reciprocatory controlling and operating member having a longitudinal series of ratchet teeth, controlled stop means therefor, in combination with a longitudinally-movable swingable pawl spring-held to said toothed portion of the bar, and a coin released latch for said pawl yieldingly held in and automatically returned to pawl locking position.

3. In a coin controlled weighing machine, an indicating mechanism embodying a controlling and an operating member, controlled stop means therefor, in combination with check controlled locking means for said mechanism embodying a swingable and longitudinally movable spring-held pawl, and a swingable coin-released spring-held latch having a pawl locking nose normally overhanging the pawl heel to prevent releasing the pawl.

4. In a coin controlled weighing machine, an indicating mechanism embodying a controlling and an operating member, in combination with a spring-held swingable and reciprocatory pawl arranged to co-operate with said member, a freely oscillating arm carrying said pawl and coin controlled locking means normally engaging a heel of said pawl to prevent a released movement thereof.

5. In a coin controlled weighing machine, a reciprocatory indicating member, controlled stop means therefor, an independently supported rockable and reciprocatory pawl yieldingly engaging said indicating member for holding the same against operative movement, and a latch for said pawl, said latch having a nose normally overhanging said pawl to prevent pawl swing while permitting pawl reciprocation, and means to receive a coin to swing the latch to release the pawl from said nose.

FREDERICK R. ANDERSON.